Figure 1:
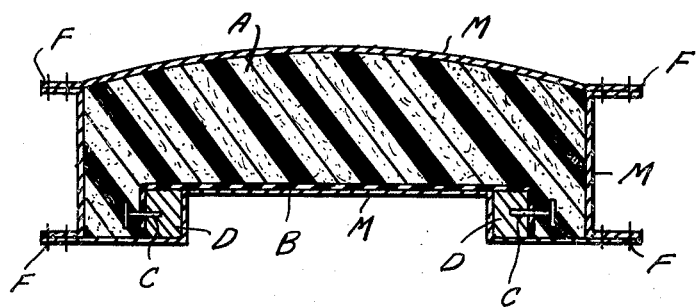

Oct. 12, 1965  J. M. BUIST ETAL  3,210,782
RESILIENT ARTICLES
Filed Jan. 31, 1964  2 Sheets-Sheet 1

INVENTORS
JACK MITCHELL BUIST
DERMOT JAMES DOHERTY

BY Cushman, Darby & Cushman
ATTORNEYS

United States Patent Office 3,210,782
Patented Oct. 12, 1965

3,210,782
RESILIENT ARTICLES
Jack Mitchell Buist and Dermot James Doherty, both of Manchester, England, assignors to Imperial Chemical Industries Limited, Millbank, London, England, a corporation of Great Britain
Filed Jan. 31, 1964, Ser. No. 341,662
Claims priority, application Great Britain, Feb. 1, 1963, 4,238/63
4 Claims. (Cl. 5—361)

This invention relates to composite resilient articles suitable for use in upholstery and to the production of such articles.

Many resilient foam materials have been proposed for use in upholstery, in particular flexible polyurethane foam material has been used for a wide variety of applications in the manufacture of upholstery. Flexible polyurethane foam materials however possess certain disadvantages which reduce their utility in the manufacture of seats and other articles of upholstery. Thus it has been found that flexible polyurethane foam material does not possess uniform compression characteristics; this is demonstrated when the percentage indentation of the foam in relation to the load applied is plotted graphically, the graph obtained instead of being linear or approximately so over the range of load applied is found to have a step over a restricted range of loads such that there is a relatively large change in indentation for very little change in load. This is a grave disadvantage when the material is used in upholstery where it is desirable that the load bearing capacity or compression charactertistics should be linear throughout.

Flexible polyurethane foam material also has the disadvantage that the material loses hardness on dynamic flexing, that is under conditions encountered when the material is used in upholstery, for example in seating applications.

It has now been found that by using flexible polyurethane foam in combination with stressed extensible webbing or sheet a composite article, suitable for use in upholstery, is formed in which the disadvantages associated with the use of flexible polyurethane foam alone are obviated or minimised. The composite article comprising the two elements of a flexible polyurethane foam and stressed extensible webbing or sheet possesses superior compression characteristics to flexible polyurethane foam used alone or on a solid base. The combination of the two elements also shows a reduction in the loss in hardness on dynamic flexing.

Thus according to the present invention there is provided a composite resilient article suitable for use in upholstery which comprises a flexible polyurethane foam element in combination with a stressed extensible elastomeric element supported on a frame.

The flexible polyurethane foam element may be manufactured according to any of the processes described or used in the prior art, for example, from hydroxyl group-containing polymers such as polyesters, polyethers or polyesteramides, and polyisocyanates in the presence of catalysts, surface active agents, colouring materials and other modifying agents. The ingredients should be such as to result in a product having the desired degree of flexibility and resiliency, the choice of these is well known in the art.

The flexible polyurethane foam element may be cut or profiled from a block of such material or may be formed in situ on the stressed extensible rubber element as is described hereinafter.

The stressed extensible elastomeric element may be in the form of a sheet of material having the desired elastomeric properties, such as a sheet of rubber, synthetic rubber or textile webbing of the type which gains elastomeric properties from its construction. Alternatively the elastomeric element may be in the form of a network of webbing comprised of strips of rubber or other elastomeric material. A preferred type of elastomeric element is in the form of a sandwich construction employing two layers of textile cord cut at opposing angles and bonded together and sandwiched with rubber.

The elastomeric element is supported on a frame for example a hollow frame such as is normally used for supporting the cushioning of a chair or seat.

The stressed extensible elastomeric element is normally prestressed so that it has a permanent tension of from 3% to 65%, a permanent tension of about 25% has been found to be convenient.

The flexible polyurethane foam element may be situated on the suitably supported stressed extensible elastomeric element merely by placing a suitably shaped polyurethane foam element on top of the supported elastomeric element so that when a load is applied to the top surface of the polyurethane foam the compression and/or indentation induced by the load is carried by the foam element and the stressed extensible elastomeric together.

Alternatively it has been found that the two elements may advantageously be in the form of an integrated structure in which the flexible polyurethane foam element is bonded to the stressed extensible elastomeric element. This leads to a composite resilient article of greater stability and strength. This may be achieved by incorporating the stressed extensible elastomeric element in the mould in which the flexible polyurethane foam element is formed by reaction of the necessary polyurethane foam-forming ingredients. Thus the flexible polyurethane foam element is formed in situ on the stressed resilient elastomeric element and becomes bonded to that latter element during manufacture giving rise to an integral structure.

Figure 2:
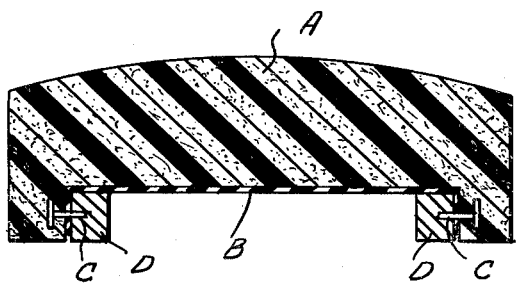
Figure 3:
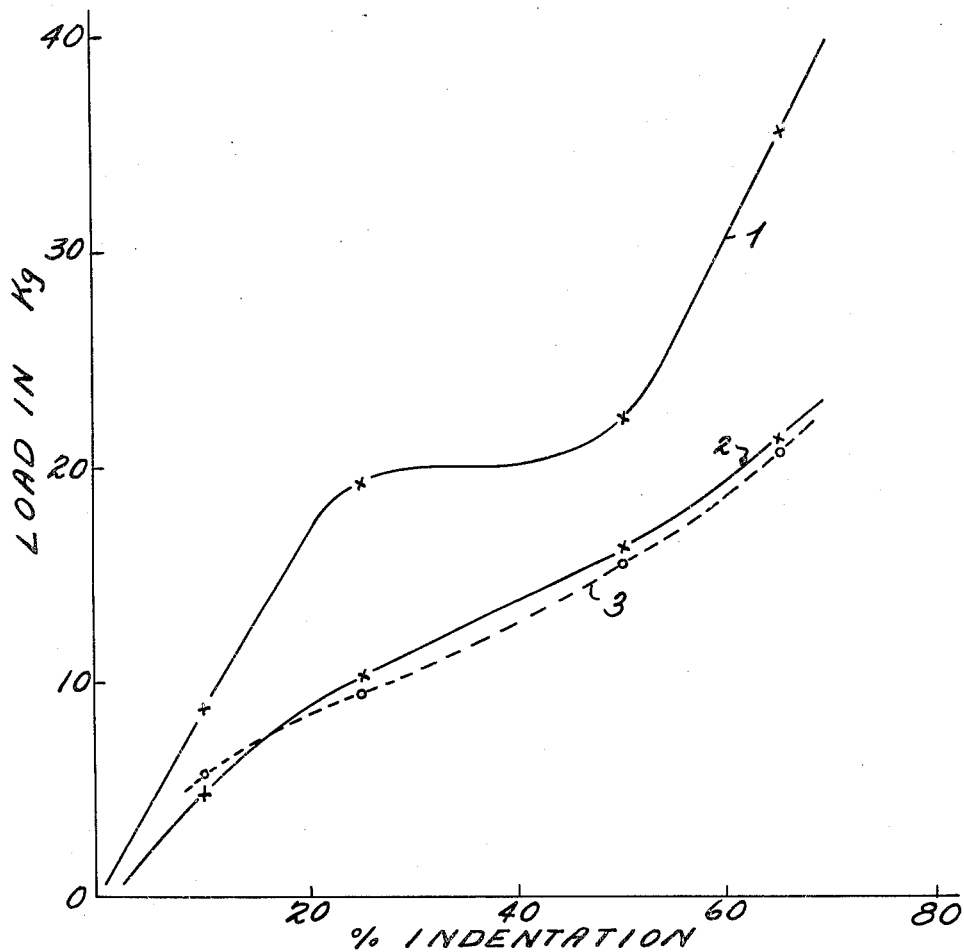

The invention is now illustrated by reference to one particular embodiment of the invention shown in the accompanying drawings wherein FIG. 1 is a cross-section of a composite article consisting of a seat cushion made by forming the flexible polyurethane foam element in situ on the stressed resilient elastomeric element in a mould. In FIG. 1 the composite article is still within the mould. FIG. 2 is a cross-section of the same composite article after removal from the mould. FIGURE 3 is a graph showing indentation characteristics of polyurethane foams.

In the drawings A is the flexible polyurethane foam element and B is a portion of the stressed resilient elastomeric element attached at the ends C to the frame D. The mould M consists of a base plate, side pieces and a top piece the various portions of the mould being secured together during the manufacture of the composite article by clips in the positions indicated by F. Provision is made where the mould clips together at the top for egress of air when the mould is filling with the expanding foam.

The drawing only shows two members of the frame D which may be of square or rectangular shape as desired.

An example of the production of a resilient composite article as illustrated in the drawings is given below.

Lengths of resilient elastomeric webbing are stretched in a stressed state over a wooden frame, 10″ of webbing being stretched over a 13.5″ centre to give a permanent tension in the webbing of 26%. The frame with webbing attached is then placed in the mould and the webbing wiped over with trichloroethylene to remove grease.

We have found that an eminently suitable webbing is a rubber webbing made by Pirelli Limited and sold under the trade name "Extraflex."

After insertion of the frame and webbing into the mould the sides of the mould are clipped in place and the polyurethane foam-forming composition is evenly distributed in the base of the mould. The lid of the mould is then clipped in position and the ingredients of the polyurethane foam-forming composition allowed to react to form the flexible polyurethane foam element in contact with the rubber webbing which forms the stressed resilient elastomeric element. During the formation of the flexible polyurethane foam element, adhesion of this element to the webbing takes place and a strong bond is formed between the two elements thus leading to the production of an integrated composite resilient article. The mould may be inclined during manufacture to allow egress of air from the mould.

The polyurethane foam is finally fully cured by heating the article in the mould in a hot oven at 120° C.

The compression characteristics of the above composite article were compared with a composite article in which the polyurethane foam was situated on a rubber webbing element but was not integral therewith and also with a flexible polyurethane foam on a solid base.

The load-indentation characteristics were measured by a Humber hardness test the results of these tests in terms of percentage indentation produced by increasing load are shown graphically in FIG. 3 wherein the lines 1, 2 and 3 represent the results obtained with the following composite articles.

(1) A flexible polyurethane foam on a solid base.
(2) A flexible polyurethane foam resting on a rubber webbing element mounted on a frame, the rubber webbing having a permanent tension of 26%.
(3) An integral composite article of moulded foam and webbing produced as described above.

The results demonstrated in FIG. 3 show that the hardness "step" in the curve (1) characteristic of flexible polyurethane foam is considerably minimised and for all practical purposes eliminated in the curves (2 and 3) obtained for the composite articles of flexible foam and rubber webbing.

The integral composite article produced as described above was subjected to a dynamic flexing test in order to ascertain whether there was any breakdown in the foam/webbing bond. Samples of this composite article were subjected to $2.5 \times 10^5$ cycles with an 8″ indentor over approximately 70 hours with a compression range of 0 to 60%.

There was no breakdown of the bond or tearing of the foam near the foam/webbing interface.

After this test, hardness tests were repeated on the samples and at 50% compression the results obtained were as follows.

| Flexing range | Loss in hardness |
|---|---|
| (2) 0–60% | 3.3%. |
| (3) 0–60% | 1.0% increase. |

These further results indicated that the resistance of the integral composite article to dynamic flexing fatigue is superior to that of a flexible polyurethane foam on a solid base. The latter gives losses in hardness of 10% or greater under the same treatment.

The composite articles of the present invention are useful in the manufacture of upholstery especially for use in the transport and furniture industries.

What we claim is:

1. A composite seat construction comprising a frame, a stressed resilient elastomeric element secured to said frame and a cushion element of flexible polyurethane foam material resting against and supported by said elastomeric element, said foam material itself possessing non-uniform load-indentation characteristics and said composite seat construction having load-indentation characteristics superior to said foam material.

2. A seat construction according to claim 1 wherein said stressed elastomeric element is bonded to the cushion element to form therewith an integrated structure.

3. A seat construction as set forth in claim 1 wherein said stressed elastomeric element is a network of web comprising strips of elastomeric material.

4. A seat construction as set forth in claim 1 wherein the stressed elastomeric element secured to said frame has a permanent tension of 3 to 65%.

References Cited by the Examiner

UNITED STATES PATENTS

| | | | |
|---|---|---|---|
| 2,532,713 | 12/50 | Gottried | 160—388 |
| 2,821,243 | 1/58 | Toulmin | 5—351 |
| 2,838,100 | 6/58 | Follows | 297—418 |
| 2,845,997 | 8/58 | Waite | 297—458 |
| 2,980,167 | 4/61 | Harris et al. | 5—361 |
| 2,989,112 | 6/61 | Sonnleitner | 156—213 |
| 3,005,213 | 10/61 | Brown et al. | 5—354 |
| 3,043,627 | 7/62 | Torjusen | 297—456 |
| 3,047,888 | 8/62 | Shecter et al. | 5—361 |
| 3,049,730 | 8/62 | Wall et al. | 5—351 |
| 3,069,701 | 12/62 | McInerney | 5—351 |
| 3,082,486 | 3/63 | Khawam et al. | 264—45 |
| 3,084,980 | 4/63 | Lawson | 297—455 |
| 3,088,773 | 5/63 | Horrocks et al. | 297—445 |
| 3,112,987 | 12/63 | Griffiths et al. | 264—45 |
| 3,116,196 | 12/63 | Terry | 264—45 |

FOREIGN PATENTS 1,275,303  9/61  France.

FRANK B. SHERRY, *Primary Examiner.*